US008560836B2

(12) United States Patent
Roegner (10) Patent No.: US 8,560,836 B2
(45) Date of Patent: *Oct. 15, 2013

(54) METHOD AND SYSTEM FOR DYNAMICALLY IMPLEMENTING AN ENTERPRISE RESOURCE POLICY

(75) Inventor: Michael W. Roegner, Plano, TX (US)

(73) Assignee: Jericho Systems Corporation, Dallas, TX (US)

(*) Notice: Subject to any disclaimer, the term of this patent is extended or adjusted under 35 U.S.C. 154(b) by 31 days.

This patent is subject to a terminal disclaimer.

(21) Appl. No.: 12/658,421

(22) Filed: Feb. 11, 2010

(65) Prior Publication Data

US 2010/0161967 A1    Jun. 24, 2010

Related U.S. Application Data

(63) Continuation of application No. 10/755,173, filed on Jan. 9, 2004, now Pat. No. 7,779,247.

(60) Provisional application No. 60/438,972, filed on Jan. 9, 2003.

(51) Int. Cl.
  *G06F 21/00*  (2013.01)
  *H04L 29/06*  (2006.01)

(52) U.S. Cl.
  USPC .................. 713/155; 713/167; 726/1; 726/4

(58) Field of Classification Search
  USPC ............................................ 726/1, 4
  See application file for complete search history.

(56) References Cited

U.S. PATENT DOCUMENTS

| 5,265,221 | A | * | 11/1993 | Miller ........................ 711/163 |
| 5,623,601 | A | | 4/1997 | Vu |
| 5,629,980 | A | | 5/1997 | Stefik et al. |
| 5,634,012 | A | | 5/1997 | Stefik et al. |
| 5,638,443 | A | | 6/1997 | Stefik et al. |
| 5,715,403 | A | | 2/1998 | Stefik et al. |
| 5,752,238 | A | | 5/1998 | Dedrick |
| 5,754,938 | A | | 5/1998 | Herz et al. |
| 5,754,939 | A | | 5/1998 | Herz et al. |
| 5,757,917 | A | | 5/1998 | Rose et al. |
| 5,761,601 | A | | 6/1998 | Nemirofsky et al. |
| 5,768,521 | A | | 6/1998 | Dedrick |
| 5,774,170 | A | | 6/1998 | Hite et al. |
| 5,781,894 | A | | 7/1998 | Petrecca et al. |
| 5,790,426 | A | | 8/1998 | Robinson |
| 5,794,210 | A | | 8/1998 | Goldhaber et al. |

(Continued)

FOREIGN PATENT DOCUMENTS

JP    2001184264    7/2001

OTHER PUBLICATIONS

Netz, et al., "Integrating Data Mining with SQL Databases: OLE DB for Data Mining", IEEE, Apr. 2001, pp. 379-387.

(Continued)

*Primary Examiner* — Hadi Armouche
(74) *Attorney, Agent, or Firm* — David R. Staggs (57) ABSTRACT

A rules evaluation engine that controls user's security access to enterprise resources that have policies created for them. This engine allows real time authorization process to be performed with dynamic enrichment of the rules if necessary. Logging, alarm and administrative processes for granting or denying access to the user are also realized. The access encompasses computer and physical access to information and enterprise spaces.

24 Claims, 6 Drawing Sheets

(56) References Cited

U.S. PATENT DOCUMENTS

| | | |
|---|---|---|
| 5,796,945 A | 8/1998 | Tarabella |
| 5,796,952 A | 8/1998 | Davis et al. |
| 5,809,242 A | 9/1998 | Shaw et al. |
| 5,838,790 A | 11/1998 | McAuliffe et al. |
| 5,848,396 A | 12/1998 | Gerace |
| 5,848,397 A | 12/1998 | Marsh et al. |
| 5,855,008 A | 12/1998 | Goldhaber et al. |
| 5,870,724 A | 2/1999 | Lawlor et al. |
| 5,872,850 A | 2/1999 | Klein et al. |
| 5,893,075 A | 4/1999 | Plainfield et al. |
| 5,913,040 A | 6/1999 | Rakavy et al. |
| 5,918,014 A | 6/1999 | Robinson |
| 5,933,498 A | 8/1999 | Schneck |
| 5,933,811 A | 8/1999 | Angles et al. |
| 5,937,392 A | 8/1999 | Alberts |
| 5,946,646 A | 8/1999 | Schena et al. |
| 5,948,061 A | 9/1999 | Merriman et al. |
| 5,960,409 A | 9/1999 | Wexler |
| 5,990,927 A | 11/1999 | Hendricks et al. |
| 5,999,912 A | 12/1999 | Wodarz et al. |
| 6,002,393 A | 12/1999 | Hite et al. |
| 6,006,197 A | 12/1999 | d'Eon et al. |
| 6,006,252 A | 12/1999 | Wolfe |
| 6,016,509 A | 1/2000 | Dedrick |
| 6,026,368 A | 2/2000 | Brown et al. |
| 6,029,141 A | 2/2000 | Bezos et al. |
| 6,029,195 A | 2/2000 | Herz |
| 6,035,404 A | 3/2000 | Zhao |
| 6,044,376 A | 3/2000 | Kurtzman, II |
| 6,049,777 A | 4/2000 | Sheena et al. |
| 6,061,659 A | 5/2000 | Murray |
| 6,070,244 A | 5/2000 | Orchier et al. |
| 6,078,866 A | 6/2000 | Buck et al. |
| 6,088,451 A | 7/2000 | He et al. |
| 6,098,065 A | 8/2000 | Skillen et al. |
| 6,119,101 A | 9/2000 | Peckover |
| 6,144,944 A | 11/2000 | Kurtzman, II et al. |
| 6,167,382 A | 12/2000 | Sparks et al. |
| 6,182,050 B1 | 1/2001 | Ballard |
| 6,185,586 B1 | 2/2001 | Judson |
| 6,192,380 B1 | 2/2001 | Light et al. |
| 6,223,215 B1 | 4/2001 | Hunt et al. |
| 6,233,608 B1 | 5/2001 | Laursen et al. |
| 6,236,971 B1 | 5/2001 | Stefik et al. |
| 6,253,203 B1 | 6/2001 | O'Flaherty et al. |
| 6,263,364 B1 | 7/2001 | Najork et al. |
| 6,269,361 B1 | 7/2001 | Davis et al. |
| 6,285,987 B1 | 9/2001 | Roth et al. |
| 6,304,967 B1 | 10/2001 | Braddy |
| 6,308,175 B1 | 10/2001 | Lang et al. |
| 6,332,163 B1 | 12/2001 | Bowman-Amuah |
| 6,385,592 B1 | 5/2002 | Angles et al. |
| 6,401,075 B1 | 6/2002 | Mason et al. |
| 6,418,433 B1 | 7/2002 | Chakrabarti et al. |
| 6,453,419 B1 | 9/2002 | Flint et al. |
| 6,466,970 B1 | 10/2002 | Lee et al. |
| 6,498,795 B1 | 12/2002 | Zhang et al. |
| 6,505,194 B1 | 1/2003 | Nikolovska et al. |
| 6,584,492 B1 | 6/2003 | Cezar et al. |
| 6,615,251 B1 | 9/2003 | Klug et al. |
| 6,647,388 B2 | 11/2003 | Numao et al. |
| 6,665,838 B1 | 12/2003 | Brown et al. |
| 6,718,551 B1 | 4/2004 | Swix et al. |
| 6,721,748 B1 | 4/2004 | Knight et al. |
| 6,757,662 B1 | 6/2004 | Greenwald et al. |
| 6,782,369 B1 | 8/2004 | Carrott |
| 6,804,659 B1 | 10/2004 | Graham et al. |
| 6,892,181 B1 | 5/2005 | Megiddo et al. |
| 6,892,354 B1 | 5/2005 | Servan-Schreiber et al. |
| 6,907,566 B1 | 6/2005 | McElfresh et al. |
| 6,978,366 B1 | 12/2005 | Ignatchenko et al. |
| 6,983,272 B2 | 1/2006 | Davis et al. |
| 6,985,882 B1 | 1/2006 | Del Sesto |
| 6,985,946 B1 | 1/2006 | Vasandani et al. |
| 6,993,534 B2 | 1/2006 | Denesuk et al. |
| 7,010,689 B1 | 3/2006 | Matyas et al. |
| 7,016,875 B1 | 3/2006 | Steele et al. |
| 7,039,599 B2 | 5/2006 | Merriman et al. |
| 7,039,804 B2 | 5/2006 | Fichtner et al. |
| 7,100,111 B2 | 8/2006 | McElfresh et al. |
| 7,120,633 B1 * | 10/2006 | Kromer ................................. 1/1 |
| 7,136,853 B1 | 11/2006 | Kohda et al. |
| 7,136,875 B2 | 11/2006 | Anderson et al. |
| 7,139,732 B1 | 11/2006 | Desenberg |
| 7,140,044 B2 | 11/2006 | Redlich et al. |
| 7,146,560 B2 | 12/2006 | Dang et al. |
| 7,162,471 B1 | 1/2007 | Knight et al. |
| 7,185,010 B2 | 2/2007 | Morinville |
| 7,207,067 B2 | 4/2007 | Feng et al. |
| 7,231,358 B2 | 6/2007 | Singh et al. |
| 7,251,666 B2 | 7/2007 | Morinville |
| 7,260,555 B2 | 8/2007 | Rossmann et al. |
| 7,346,606 B2 | 3/2008 | Bharat |
| 7,349,876 B1 | 3/2008 | Veach |
| 7,434,048 B1 | 10/2008 | Shapiro et al. |
| 7,434,257 B2 * | 10/2008 | Garg et al. ...................... 726/21 |
| 7,454,409 B2 | 11/2008 | Roy et al. |
| 7,478,418 B2 | 1/2009 | Supramaniam et al. |
| 7,496,943 B1 | 2/2009 | Goldberg et al. |
| 7,499,874 B2 | 3/2009 | Singh et al. |
| 7,512,976 B2 | 3/2009 | Burrows |
| 7,565,683 B1 | 7/2009 | Huang et al. |
| 7,647,299 B2 | 1/2010 | Harik |
| 7,668,832 B2 | 2/2010 | Yeh et al. |
| 7,685,156 B2 | 3/2010 | Morinville |
| 7,693,827 B2 | 4/2010 | Zamir et al. |
| 7,697,791 B1 | 4/2010 | Chan et al. |
| 7,698,230 B1 | 4/2010 | Brown et al. |
| 7,698,266 B1 | 4/2010 | Weissman et al. |
| 7,707,053 B2 | 4/2010 | Veach |
| 7,716,161 B2 | 5/2010 | Dean et al. |
| 7,734,624 B2 | 6/2010 | Anderson et al. |
| 7,778,872 B2 | 8/2010 | Kamangar et al. |
| 7,783,765 B2 | 8/2010 | Hildebrand et al. |
| 7,792,698 B1 | 9/2010 | Veach et al. |
| 7,792,828 B2 | 9/2010 | Roegner |
| 7,813,966 B2 | 10/2010 | Alaia et al. |
| 7,818,207 B1 | 10/2010 | Veach |
| 7,822,777 B2 | 10/2010 | Morinville |
| 7,827,062 B2 | 11/2010 | Merriman et al. |
| 7,831,693 B2 | 11/2010 | Lai |
| 7,844,488 B2 | 11/2010 | Merriman et al. |
| 7,844,493 B1 | 11/2010 | Veach et al. |
| 7,865,931 B1 * | 1/2011 | Stone et al. ...................... 726/1 |
| 7,873,536 B2 | 1/2011 | Desikan et al. |
| 2001/0037205 A1 | 11/2001 | Joao |
| 2001/0056374 A1 | 12/2001 | Joao |
| 2002/0002684 A1 | 1/2002 | Fox et al. |
| 2002/0013785 A1 | 1/2002 | Miyazaki et al. |
| 2002/0019831 A1 | 2/2002 | Wade |
| 2002/0032740 A1 | 3/2002 | Stern et al. |
| 2002/0046118 A1 | 4/2002 | Minte |
| 2002/0052928 A1 | 5/2002 | Stern et al. |
| 2002/0066042 A1 | 5/2002 | Matsumoto et al. |
| 2002/0082923 A1 | 6/2002 | Merriman et al. |
| 2002/0099600 A1 | 7/2002 | Merriman et al. |
| 2002/0103698 A1 | 8/2002 | Cantrell |
| 2002/0112035 A1 | 8/2002 | Carey |
| 2002/0112155 A1 | 8/2002 | Martherus et al. |
| 2002/0120507 A1 | 8/2002 | Chanos et al. |
| 2002/0156779 A1 | 10/2002 | Elliott et al. |
| 2003/0023489 A1 | 1/2003 | McGuire et al. |
| 2003/0120601 A1* | 6/2003 | Ouye et al. ...................... 705/51 |
| 2003/0154406 A1 | 8/2003 | Honarvar et al. |
| 2003/0167298 A1 | 9/2003 | Bazinet |
| 2004/0268388 A1 | 12/2004 | Roegner |
| 2005/0086244 A1 | 4/2005 | Morinville |
| 2005/0097188 A1 | 5/2005 | Fish |
| 2010/0312741 A1 | 12/2010 | Roegner |

OTHER PUBLICATIONS

Thorpe, "Business Rule Exchange—the Next XML Wave", May 21-25, 2001, XML Europe 2001 Internationales Congress Centrum (ICC) Berlin, Germany.

(56) References Cited

OTHER PUBLICATIONS

Marquardt, ASP.NET Performance Monitoring, and When to Alert Administrators, updated Jul. 2003, Microsoft Corporation, ASP.NET Technical Articles, 17 pages.
Office Action (non-final) issued on Apr. 30, 2007 for U.S. Appl. No. 10/755,173.
Office Action (final) issued on Apr. 18, 2008 for U.S. Appl. No. 10/755,173.
Office Action (interview summary) issued on Jul. 25, 2008 for U.S. Appl. No. 10/755,173.
Office Action (non-final) issued on Oct. 2, 2008 for U.S. Appl. No. 10/755,173.
Office Action (non-final) issued on Nov. 21, 2007 for U.S. Appl. No. 10/852,406.
Office Action (final) issued on Aug. 13, 2008 for U.S. Appl. No. 10/852,406.
Office Action (interview summary) issued on Jan. 2, 2009 for U.S. Appl. No. 10/852,406.
Office Action (non-final) issued on Mar. 24, 2009 for U.S. Appl. No. 10/852,406.
U.S. Appl. No. 10/852,406, filed May 24, 2004.
U.S. Appl. No. 10/755,173, filed Jan. 9, 2004.
Notice of Allowance for U.S. Appl. No. 10/755,173, mailed Mar. 6, 2009.
Notice of Allowance for U.S. Appl. No. 10/755,173, mailed Jun. 26, 2009.
Interview Summary mailed Oct. 21, 2009 for U.S. Appl. No. 10/755,173.
Notice of Allowance for U.S. Appl. No. 10/755,173, mailed Dec. 17, 2009.
Office Action (non-final) issued Dec. 23, 2009 for U.S. Appl. No. 10/852,406.
Notice of Allowance for U.S. Appl. No. 10/852,406, mailed May 6, 2010.
U.S. Appl. No. 12/855,308, filed Aug. 12, 2010.
In the U.S. Patent and Trademark Office, Notice of Allowance in re: U.S. Appl. No. 10/755,173, dated Dec. 17, 2009, 6 pages.
In the U.S. Patent and Trademark Office, Notice of Allowance in re: U.S. Appl. No. 10/755,173, dated Jun. 26, 2009, 7 pages.
In the U.S. Patent and Trademark Office, Notice of Allowance in re: U.S. Appl. No. 10/755,173, dated Mar. 6, 2009, 4 pages.
In the U.S. Patent and Trademark Office, Office Action in re: U.S. Appl. No. 10/755,173, dated Oct. 2, 2008, 9 pages.
In the U.S. Patent and Trademark Office, Final Office Action in re: U.S. Appl. No. 10/755,173, dated Apr. 18, 2008, 7 pages.
In the U.S. Patent and Trademark Office, Office Action in re: U.S. Appl. No. 10/755,173, dated Apr. 30, 2007, 12 pages.
In the U.S. Patent and Trademark Office, Notice of Allowance in re: U.S. Appl. No. 10/852,406, dated May 6, 2010, 6 pages.
In the U.S. Patent and Trademark Office, Office Action in re: U.S. Appl. No. 10/852,406, dated Dec. 23, 2011, 9 pages.
In the U.S. Patent and Trademark Office, Office Action in re: U.S. Appl. No. 10/852,406, dated Mar. 24, 2009, 13 pages.
In the U.S. Patent and Trademark Office, Final Office Action in re: U.S. Appl. No. 10/852,406, dated Aug. 13, 2008, 13 pages.
In the U.S. Patent and Trademark Office, Office Action in re: U.S. Appl. No. 10/852,406, dated Nov. 21, 2007, 16 pages.
In the U.S. Patent and Trademark Office, Office Action in re: U.S. Appl. No. 12/855,308, dated Jan. 12, 2011, 11 pages.
Barroso et al., Web search for a planet: The Google Cluster Architecture, [online], IEEE Micro 23(2), Mar.-Apr. 2003, 22-28. Retrieved from the Internet: <URL: http://static.googleusercontent.com/external_content/untrusted_dlcp/labs.google.com/en/us/papers/googlecluster-ieee.pdf>, pp. 22-28.
Ghemawat et al., The Google File System, in Proc. 19th ACM Symp. on Operating Syst. Principles, Oct. 19-22, 2003. Retrieved from the Internet: <URL: http://static.googleusercontent.com/external_content/untrusted_dlcp/research.google.com/en/us/archive/gfs-sosp2003.pdf>, pp. 29-43.

Yagen, FTF#1 Jul. 18, 2001 Minutes, [online], Jul. 23, 2001. Message posted to xacml@lists.oasis-open.org, archived at and retrieved from the Internet: <URL: http://lists.oasis-open.org/archives/xacml/200107/msg00033.html>, pp. 1-11.
Pilz, XACML Draft-xtc-use-domain-01, [online], Jun. 7, 2001. Retrieved from the Internet: <URL: http://lists.oasis-open.org/archives/xacml/200106/doc00000.doc>, pp. 1-3.
Pilz, Domain model, Draft-xtc-use-domain-02, [online], Jun. 12, 2001. Retrieved from the Internet: <URL: http://lists.oasis-open.org/archives/xacml/200107/doc00000.doc>, pp. 1-5.
OASIS eXtensible Access Control Markup Language TC, Face to Face Meeting #1 of the XACML TC Agenda, [online], Updated Jul. 17, 2001. Retrieved from the Internet: <URL: http://www.oasis-open.org/committees/xacml/agendas/20010718-f2f1.shtml>, pp. 1-3.
Kudoh, [use case] revised document, [online], Sep. 4, 2001. Message posted to xacml@lists.oasis-open.org, archived at and retrieved from the Internet: <URL: http://lists.oasis-open.org/archives/xacml/200109/msg0003.html>, pp. 1-2.
Moses, Clinical Record Use Cases, [online], Sep. 4, 2001 [retrieved on Sep. 9, 2001]. Retrieved from the Internet: <URL: http://lists.oasis-open.org/archives/xacml/200109/pdf00001.pdf>, pp. 1-45.
OASIS eXtensible Access Control Markup Language TC, Face to Face Meeting 2 Agenda, [online], to be delivered Sep. 10, 2001. Retrieved from the Internet: <URL: http://www.oasis-open.org/committees/xacml/agendas/20010910-f2f2.shtml#minutes>, pp. 1-3.
Kudoh, Slides used in F2F#2, [online], Sep. 11, 2001. Message posted to xacml@lists.oasis-open.org, archived at and retrieved from the Internet: <URL: http://lists.oasis-open.org/archives/xacml/200109/msg00055.html>.
Kudoh, F2F 2 meeting slides Use Case and Requirement, [online], Sep. 10, 2011. Retrieved from the Internet: <URL: http://lists.oasis-open.org/archives/xacml/200109/bin00006.bin>, pp. 1-8.
Moses et al., XACML language proposal V. 0.4, [online], Nov. 5, 2001. Retrieved from the Internet: <URL: http://lists.oasis-open.org/archives/xacml/200111/doc00002.doc>, pp. 1-13.
Moses et al., XACML language proposal V. 0.6, [online], Nov. 23, 2001. Retrieved from the Internet: <URL: http://lists.oasis-open.org/archives/xacml/200111/doc00005.doc>, pp. 1-23.
Moses et al., XACML language proposal V. 0.7, [online], Nov. 27, 2001. Retrieved from the Internet: <URL: http://lists.oasis-open.org/archives/xacml/200111/doc00006.doc>, pp. 1-30.
Moses et al., XACML language proposal V. 0.8. [online], Jan. 10, 2002. Retrieved from the Internet: <URL: http://lists.oasis-open.org/archives/xacml/200201/doc00000.doc>, pp. 1-35.
Moses et al., draft-xacml-v0.9, [online], Feb. 14, 2002. Retrieved from the Internet: <URL: http://lists.oasis-open.org/archives/xacml/200202/doc00002.doc>, pp. 1-32.
Yagen, [xacml] XACML Feb. 21, 2002 Minutes, [online], Sep. 4, 2001. Message posted to xacml@lists.oasis-open.org, archived at and retrieved from the Internet: <URL: http://lists.oasis-open.org/archives/xacml/200202/msg00124.html>, pp. 1-5.
Moses et al., draft-xacml-v0.10, [online], Mar. 8, 2002. Retrieved from the Internet: <URL: http://lists.oasis-open.org/archives/xacml/200203/doc00000.doc>, pp. 1-35.
Lockhart, [xacml] Champions missing from F2F, [online], Mar. 7, 2002. Message posted to xacml@lists.oasis-open.org, archived at and retrieved from the Internet: <URL: http://lists.oasis-open.org/archives/xacml/200203/msg00014.html>, p. 1.
Moses et al., draft-xacml-v0.11, [online], Mar. 19, 2002. Retrieved from the Internet: <URL: http://lists.oasis-open.org/archives/xacml/200203/doc00002.doc>, pp. 1-41.
Adams, [xacml] Major milestone achieved, and next step . . . , [online], Mar. 28, 2002. Message posted to xacml@lists.oasis-open.org, archived at and retrieved from the Internet: <URL: http://lists.oasis-open.org/archives/xacml/200203/msg00112.html>, pp. 1-2.
Maclean, [xacml] RE: [xacml] XrML & XACML Review, [online], Apr. 1, 2002. Message posted to xacml@lists.oasis-open.org, archived at and retrieved from the Internet: <URL: http://lists.oasis-open.org/archives/xacml/200204/msg00000.html>, pp. 1-2.
Moses et al., draft-xacml-v0.12, [online], Apr. 2, 2002. Retrieved from the Internet: <URL: http://lists.oasis-open.org/archives/xacml/200204/doc00001.doc>, pp. 1-44.

(56) References Cited

OTHER PUBLICATIONS

Anderson, [xacml] Examples of J2SE Policy via XACML, [online], Apr. 19, 2002. Message posted to xacml@lists.oasis-open.org, archived at and retrieved from the Internet: <URL: http://lists.oasis-open.org/archives/xacml/200204/msg00130.html>, pp. 1-7.
Adams et al., Oasis XACML Technical Committee Meeting, [online], Apr. 22, 2002. Retrieved from the Internet: <URL: http://lists.oasis-open.org/archives/xacml/200205/doc00000.doc>, pp. 1-12.
Kudoh, [xacml] US Patent Application, [online], May 3, 2002. Message posted to xacml@lists.oasis-open.org, archived at and retrieved from the Internet: <URL: http://lists.oasis-open.org/archives/xacml/200205/msg00006.html>, pp. 1-2.
Moses et al., draft-xacml-v14, [online], Jun. 14, 2002. Retrieved from the Internet: <URL: http://lists.oasis-open.org/archives/xacml/200206/doc00000.doc>, pp. 1-57.
Erickson, Re: [xacml] Fundamental concepts in XACML, [online], Jun. 17, 2002. Message posted to xacml@lists.oasis-open.org, archived at and retrieved from the Internet: <URL: http://lists.oasis-open.org/archives/xacml/200206/msg00052.html>, pp. 1-3.
Anderson, [xacml] Commit to implement XACML?, [online], Jun. 25, 2002. Message posted to xacml@lists.oasis-open.org, archived at and retrieved from the Internet: <URL: http://lists.oasis-open.org/archives/xacml/200206/msg00090.html>, pp. 1-2.
Moses et al., draft-xacml-v15, [online], Jul. 12, 2002. Retrieved from the Internet: <URL: http://lists.oasis-open.org/archives/xacml/200207/doc00003.doc>, pp. 1-56.
Anderson, [xacml] RE: Conformance Tests, [online], Sep. 5, 2002. Forwarded message from John Howard. Message posted to xacml@lists.oasis-open.org, archived at and retrieved from the Internet: <URL: http://lists.oasis-open.org/archives/xacml/200209/msg00027.html>, pp. 1-3.
Moses et al., OASIS eXtensible Access Control Markup Language (XACML) Committee Specification 1.0, [online], Oct. 8, 2002. Retrieved from the Internet: <URL: http://lists.oasis-open.org/archives/xacml/200210/doc00000.doc>, pp. 1-117.
Moses et al., OASIS eXtensible Access Control Markup Language (XACML) Committee Specification 1.0, [online], Oct. 25, 2002. Retrieved from the Internet: <URL: http://lists.oasis-open.org/archives/xacml/200210/doc00004.doc>, pp. 1-121.
Best, [xacml] Re: XACML 1.0 approved as a Committee Specification! [online], Nov. 8, 2002. Message posted to xacml@lists.oasis-open.org, archived at and retrieved from the Internet: <URL: http://lists.oasis-open.org/archives/xacml/200211/msg00118.html>, pp. 1-3.
Adams, FW: ContentGuard IPR Declaration for OASIS re. XACML, [online], Nov. 26, 2002. Message posted to xacml@lists.oasis-open.org, archived at and retrieved from the Internet: <URL: http://lists.oasis-open.org/archives/xacml/200211/msg00189.html pp. 1-2.
Moses et al., OASIS eXtensible Access Control Markup Language (XACML) Committee Specification 1.0 (Revision 1), [online], Dec. 12, 2002. Retrieved from the Internet: <URL: http://lists.oasis-open.org/archives/xacml/200212/doc00001.doc>, pp. 1-129.
Lockhart, [xacml] Slides Presented to PRISM, [online], Jan. 9, 2003. Message posted to xacml@lists.oasis-open.org, archived at and retrieved from the Internet: <URL: http://lists.oasis-open.org/archives/xacml/200301/msg00005.html>, pp. 1.
Lockhart, (Power point Slides presented Dec. 11, 2002) eXtensible Access Control Markup Language (XACML), pp. 1-21.
"eXtensible Access Control Markup Language (XACML) Version 1.0", OASIS Standard, Feb. 18, 2003, 132 pages.
"OASIS eXtensible Access Control Markup Language (XACML)", Committee Specification 1.0, Nov. 7, 2002, 129 pages.
Carlisle Adams, "XACML 1.0 approved as a Committee Specification", Nov. 8, 2002, 2 pages.
In the U.S. Patent and Trademark Office U.S. Appl. No. 10/755,173, Interview Summary dated Jul. 25, 2008, 4 pages.
In the U.S. Patent and Trademark Office U.S. Appl. No. 12/855,308, Non-Final Office Action dated Jan. 12, 2011, 11 pages.
In the U.S. Patent and Trademark Office U.S. Appl. No. 13/245,737, Non-Final Office Action dated Jul. 26, 2012, 12 pages.
Moses et al., draft-xacml-v16, (online), Aug. 22, 2002. Retrieved from the Internet: URL:http:lists.oasls-open.org/archives/xacml/200208/doc00009.doc, pp. 1-86, (converted to black and white).
Moses et al., draft-xacml-v12, [online], Sep. 27, 2002, Retrieved from the Internet: <URL: http://lists.oasis-open.org/archives/xacml/200209/doc00002.doc>, pp. 1-113, (converted to black and white).

* cited by examiner

FIG. 4
Dynamic Enrichment Process

METHOD AND SYSTEM FOR DYNAMICALLY IMPLEMENTING AN ENTERPRISE RESOURCE POLICY

PRIORITY CLAIM

This application is a continuation of U.S. patent application Ser. No. 10/755,173 filed on Jan. 9, 2004, now allowed, which is incorporated herein by reference in its entirety and claims the benefit of U.S. Provisional Patent Application Ser. No. 60/438,972, filed on Jan. 9, 2003, which is also incorporated herein by reference in its entirety.

BACKGROUND

The invention relates to establishing and maintaining security access policies for enterprise resources. Historically, a trade-off exists between user function and system security. More system functionality often means lower levels of security. As feature set expanded, the overhead of administration and enforcement of security policy within the application has grown an exponentially. Additionally, the Internet has allowed commercial users to directly interact with customers. The overhead associated with maintaining permissions for individual users and customers has become a serious constraint upon the ability of companies to grow.

Access control decision began as a simple list of "named users" for each resource under management. When a user wanted to invoke a function, his identity was checked against the access control list (ACL) for that function. If the user was not on the list, the user's access would be denied. For very small user populations this was an acceptable way to do business. As system functionality and user community sizes began to increase, however, this proved to be a severely constrained architecture. It is not unusual to find single applications with 20 or more ACL's, each having hundreds to thousands of entries.

Next, access management began to form and utilize user groups. The concept is relatively simple—each user is "enrolled" in one or more groups, and the ACL's were reconfigured to grant access to groups as well as named users. This solution reduced the overhead of adding a new user to the environment, as adding a user to a group had the net effect of adding him dynamically to the ACL of all resources granting that group permissions. Unfortunately, it created some major problems that did not solve the inadequacies of the "named user" model.

Permissions, once granted to a user or group, were static. If the security policy for a resource was modified, every ACL and Group associated with the resource had to be reviewed and redefined to ensure that only those who met the current criteria for use were permitted access. In this situation, the list of users impacted could number in the tens of thousands.

Access controls have also been abstracted through several levels. The administration has been often split into multiple areas of responsibility. For example, ACL administration was generally performed by development groups responsible for the applications, while group administration typically under control of Information Security. This solution provides was an extremely convoluted process to track user access to an individual resource. Generally it is simpler to grant a user access to a new group each time he changes jobs rather than to determine the user's current permissions and modify these permissions based on his new position.

While official policies may exist as to who should be granted access, interpretation and enforcement are typically inconsistent. Users are assigned to groups by people who traditionally are overworked and understaffed. Additionally, as membership in an ACL or group is statically granted, systems cannot easily handle access control decisions based on dynamic data such as time, location, employee status, etc. Thus, most enterprises and their users suffer as a result.

One particular recent prior art solution offers an extremely broad computer based rules management system. The solution makes a decision on a proposed action of a system component without defining the component as an application. However, there exists a need for the accessing entity to be a user requesting access to a physical space, such as a building, computer room, etc.

SUMMARY

The present invention provides a system and method to establish and maintain security access policies that substantially eliminates or reduces disadvantages and problems associated with previously developed systems and methods.

More specifically, the present invention provides a centralized system that controls the enterprise security policy evaluation process. This system is operable to create coded policies for each of the plurality of resources. User authorization requests are received from a requesting server. A determination is then made as to which security resource access is requested. The policy associated with the resource is accessed, retrieved and analyzed to identify the data elements from the policies to evaluate. These elements are then evaluated in real time to produce a grant or a denial of authorization access for the requester, while maintaining a log of each event.

One important technical advantage of the present invention is that the policies of this Enterprise Resource do not need to contain executable code. The policies are captured in a representative notational format, and then stored in an XML encoded structure in a repository. The Enterprise Resource Policy definition is analyzed at evaluation time to determine the behaviors, but has no execution capability in its own right. The other clause implies that all variable information required for policy evaluation is retrieved dynamically. The Enterprise Resource Policy invention model provides for both parametric input of data (passed in with the request) and dynamic retrieval of those data items that aren't passed as an option, not mandatory.

Additionally, the present invention's policies are essentially stateless—each evaluation is atomic, and no state data is retained across evaluation requests.

The present invention's architecture precludes a direct user interface to the policy. Instead, an API interface is provided to the Policy Enforcement Point (PEP). The PEP maintains the interface to the user, and provides the user identity and any parametric information to the rules engine as part of the request structure.

The present invention provides another advantage in the fact that the Enterprise Resource Policy invention has no policy objects. The present invention's evaluations take place inside a general-purpose body of code, which analyzes and interprets the policy described in the policy definition. Additionally, the present invention does not utilize the COM model in any way. The present invention operates upon the mechanism of an embedded remote procedure call (RPC) to an external rules analysis engine to make decisions. This differs from the COM model where the COM object is actually executed within the address space and execution context of the client module, and is thus potentially vulnerable to corruption or even deliberate modification by the client module. Furthermore, the connections to external data sources have to be established from within the execution context—as such, the client module would potentially have addressability to all variable information retrieved for the evaluation of the policy. This represents a substantial advantage for the present invention and difference from prior solutions. In prior solutions, the evaluation is in an external process, one that the client module has no direct access to. However, in the present invention, the client module does not have access to the data sources or the data values themselves. This allows the security policy to be defined that bases its decisions upon data elements that the client module has no right to see.

Additionally, the prior art associates an action to an object, which embodies the executable code, which defines the security policy for a component. However, the present invention provides a hierarchical structure of resources to be maintained, that each may be associated with multiple action types. Policies are saved as data, within the hierarchy. In the event that no specific policy for a resource/action exists, it can "inherit" the policy from its ancestor. The prior concept of a "Trust" manager has no relevance and in fact greatly limits capabilities and scaling.

Current access control models are based upon the concept of "named users", where permissions are explicitly granted and persistent. This leads to an unwieldy management process when the user population is large or changes frequently, or when the policy by which security permissions are granted must be changed. Our model eliminates these problems by discarding the persistent retention of permissions, instead deriving those permissions at access time by evaluating the current state of user and transactional attributes against a policy, expressed as a rule. The rule effectively defines a "profile" of what an authorized user should look like, rather than maintaining a pre-determined list of those who are deemed "eligible" for access. In the Internet space this is particularly appealing, as modern Internet-based applications frequently have user populations numbering in the tens of millions—traditional ACL based systems aren't capable of performing efficiently at a task of this magnitude.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DESCRIPTION

Preferred embodiments of the present invention are illustrated in the Figures, like numerals being used to refer to like and corresponding parts of the various drawings.

Figure 1:
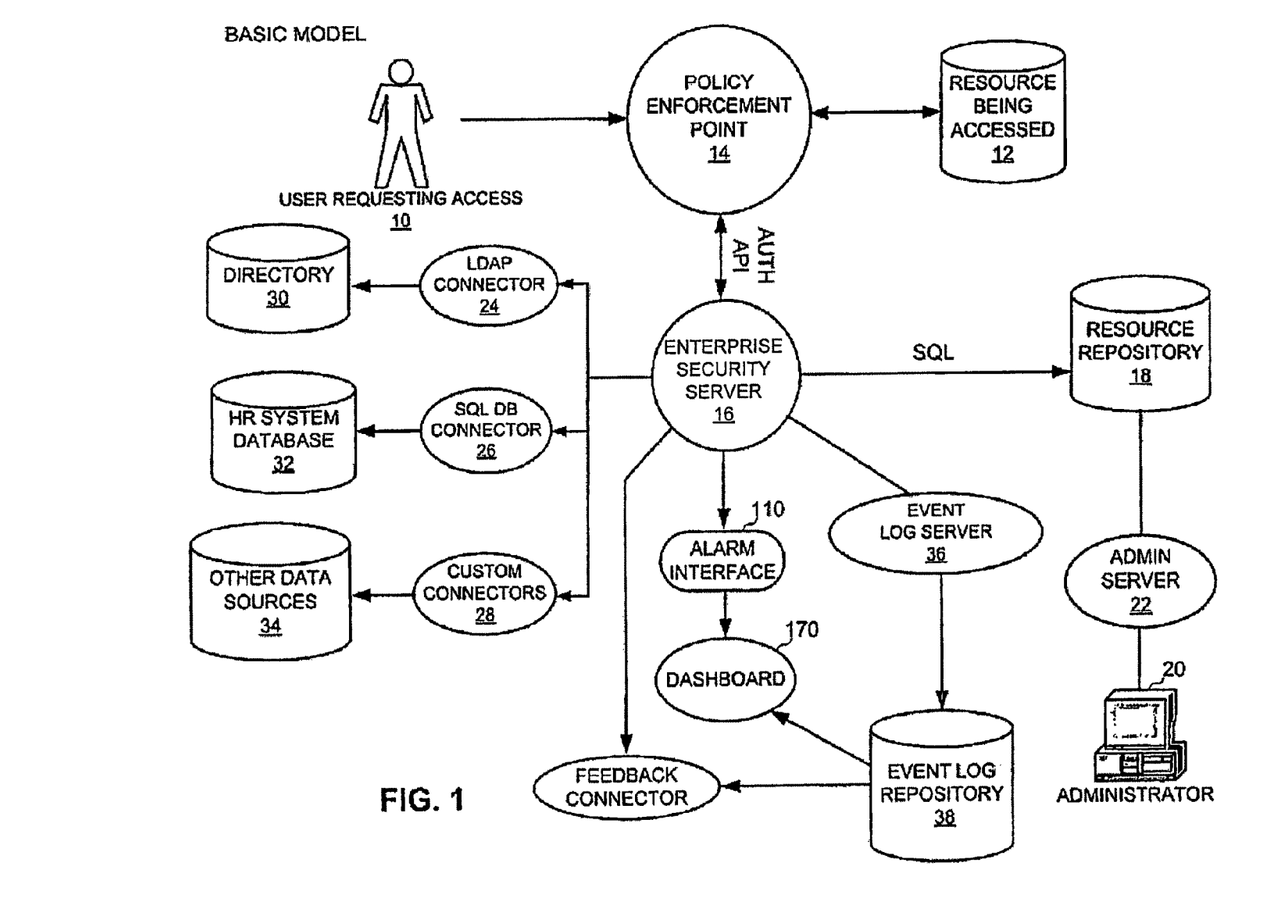
FIG. 1 depicts a Basic Model of dynamically implementing an enterprise resource policy in accordance with the present invention.

A sample architecture for the use of the enterprise security policy manager is depicted in FIG. 1. Here, user 10 wishes to access a secured resource from the corporate repository. User 10 establishes his electronic identity by authenticating (logging in) to the policy enforcement point 14.

User 10 then makes a request of the policy enforcement point 14 to retrieve the information/service/access. Server 16 receives the request. Server 16 analyzes the request to determine which resource 12 is being accessed. To evaluate the request, policy enforcement point 14 sends a request for policy evaluation to enterprise security server 16. This request contains both the identity of the user and the name of the resource being accessed.

Enterprise security server 16 uses the resource name to retrieve the policy associated with the resource. Server 16 then examines the policy to determine what additional information is needed about the user to evaluate the policy. Administrator 20 for the processes is linked through and administrative server 22 to control any or all elements.

Enterprise security server 16 invokes connectors 24, 26, and 28 to each of the needed data sources to retrieve the information required to evaluate the policy. These data are illustrated as directory 30, HR System database 32 and other data sources 34. These data sources return the data items needed to enterprise security server 16.

Enterprise security server 16 enriches the decision context with the information retrieved. It then evaluates the policy and reaches a decision as to whether the request should be granted. Enterprise security server 16 replies to the policy enforcement point 14 with an approval or denial of access. If approved, requested resource 12 is returned and made accessible or delivered to user 10.

Event log server 36 may create a log of every transaction, which may be stored in the event log repository 38. Any alarm events are sent to an alarm interface module 110 that disseminates them appropriately. This dissemination may include dashboard 170 for displaying and tracking multiple event scenarios mapped by the administrator.

Figure 2:
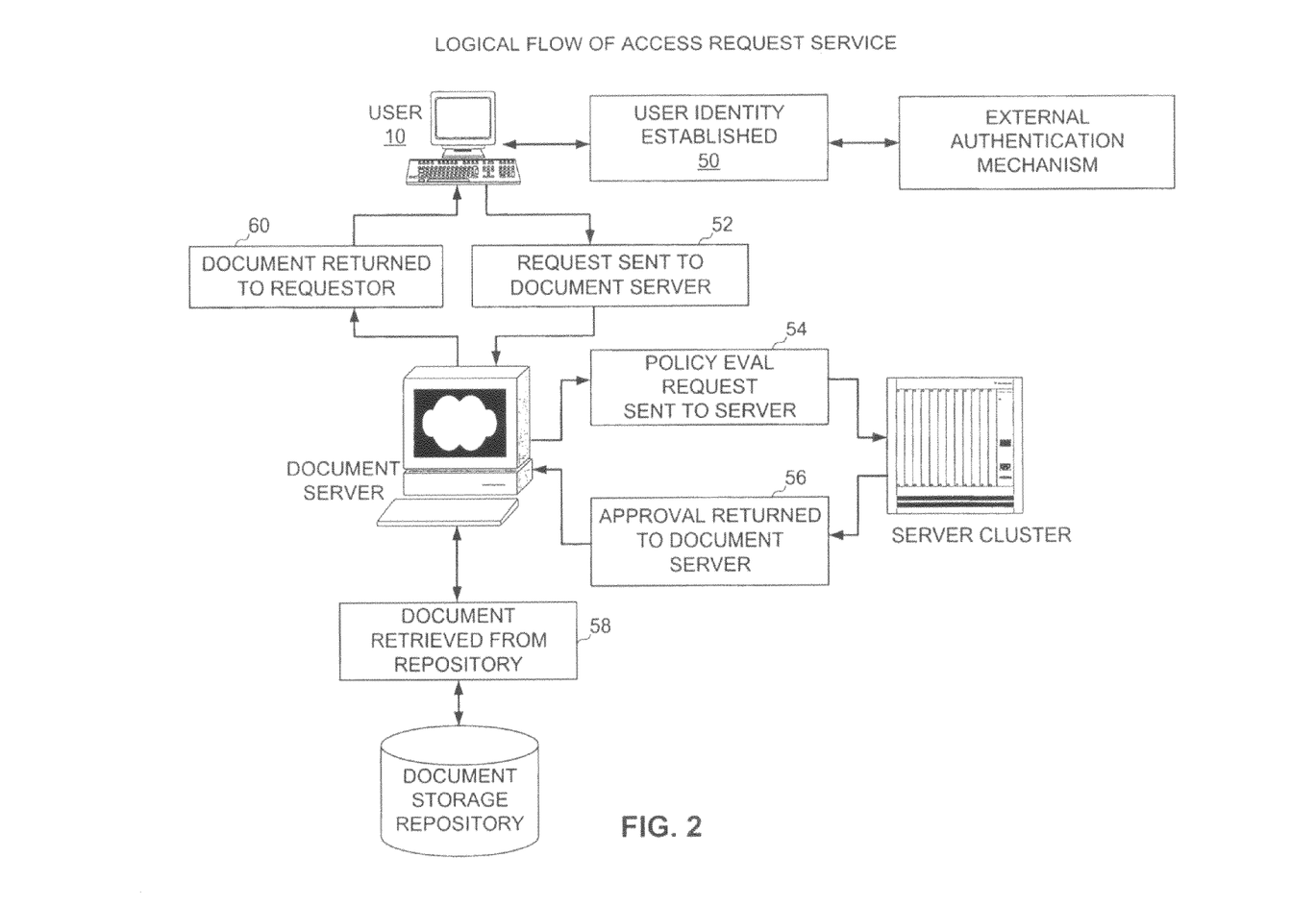
FIG. 2 is a logic flow diagram providing a Dynamic Enrichment Process flowchart that depicts the rules engine used to determine whether all of the data elements required to evaluate the policy are available.

FIG. 2 provides a process flow diagram that depicts Logical flow of Access Request Service. This flow diagram depicts an example of processing a user's request. In step 50, a user established the identity by authentication. Next, a request is sent to a document server in step 52. The document server then requests a policy evaluation in step 54. The approval, if granted, is returned to the document server in step 56 allowing the document server to proceed. In this case, the document server may retrieve the requested document from repository in step 58. Then this resource is returned to the requester in step 60.

This model enables a great deal of new functionality in the security evaluation process. As the evaluation occurs in real time, at the moment the resource is being accessed, information that is time or condition sensitive can be utilized in the policy, as can transaction specific information such as transaction values. Also available for the inclusion into the decision context are items such as identity strength (did the user authenticate with a simple password challenge, or by a stronger method such as a thumbprint scan), the network address the request originated from (within the building, from an internal network or over the Internet), or other like context information as known to those skilled in the art. Policies can be dynamically updated at any time, as can user attributes within the identity repositories. This allows an enormous amount of flexibility in creating and managing access control policies, without incurring the old-style burdens of ACL and group membership.

When a policy changes, the changed policy applies to all users immediately—the next request processed will be evaluated against the new policy, and the information needed to evaluate the request will be dynamically located and retrieved. This provides an additional advantage in the form of what has come to be known as "single sign out", in which if an employee or user is terminated, all of his abilities to access critical resources could be revoked by simply changing his employee status in the identity repository from "active" to "terminated". Of course, this only applies if the policies for each of those critical resources were designed to require and employee status of "active" for access to be granted.

The ability to offer these capabilities is based upon a number of new concepts.

Figure 3:
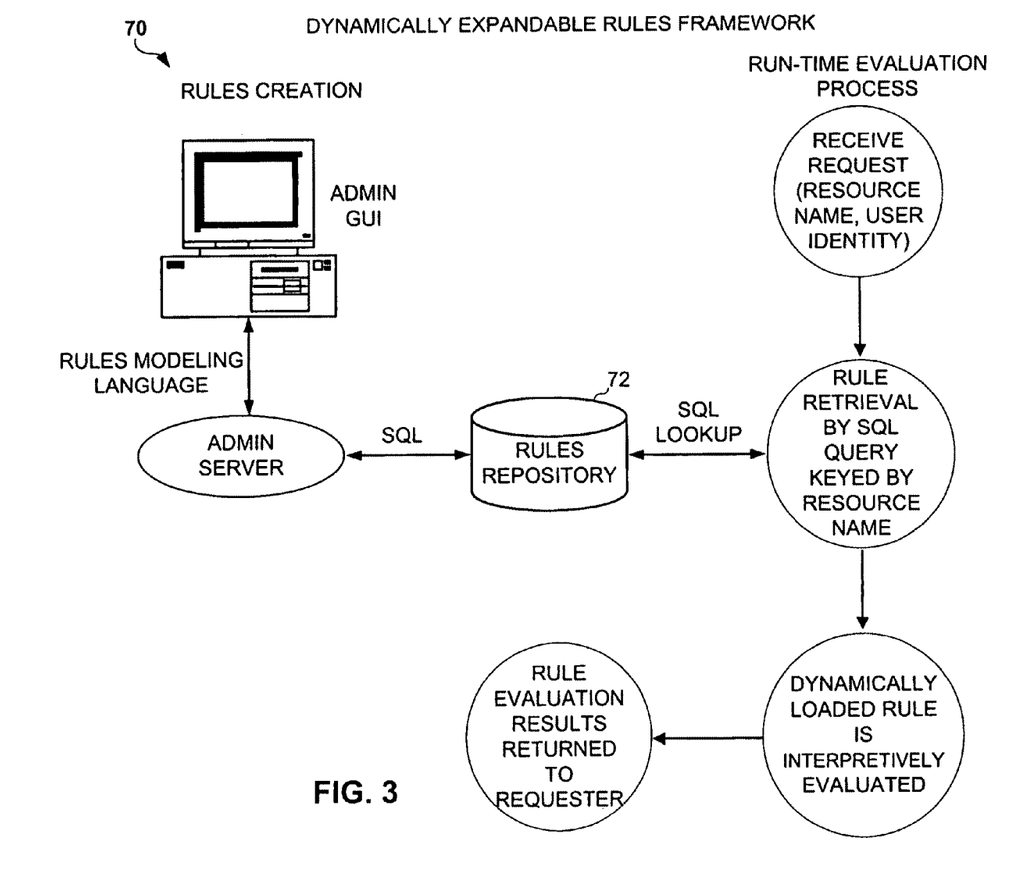
FIG. 3 is a diagram of the Dynamically Expandable Rules Framework that describes a process, implemented in code, by which invocation of a service can be made both enabled for parallel scaling and tolerant of failure of components in accordance with the present invention.

A dynamically extensible rules evaluation engine 70 is depicted in FIG. 3. Rules evaluation engine 70 is based upon the concept of using a process by which a policy is expressed as a rule, encoded in a machine-independent rules modeling language. The rule can be dynamically loaded from the repository 72 and evaluated upon demand within multiple execution contexts simultaneously. This provides for parallel scaling and fault tolerant capabilities. As the rules are loaded dynamically at evaluation time, rules may be created and/or changed at will, and will take effect upon the next evaluation request.

Figure 4:
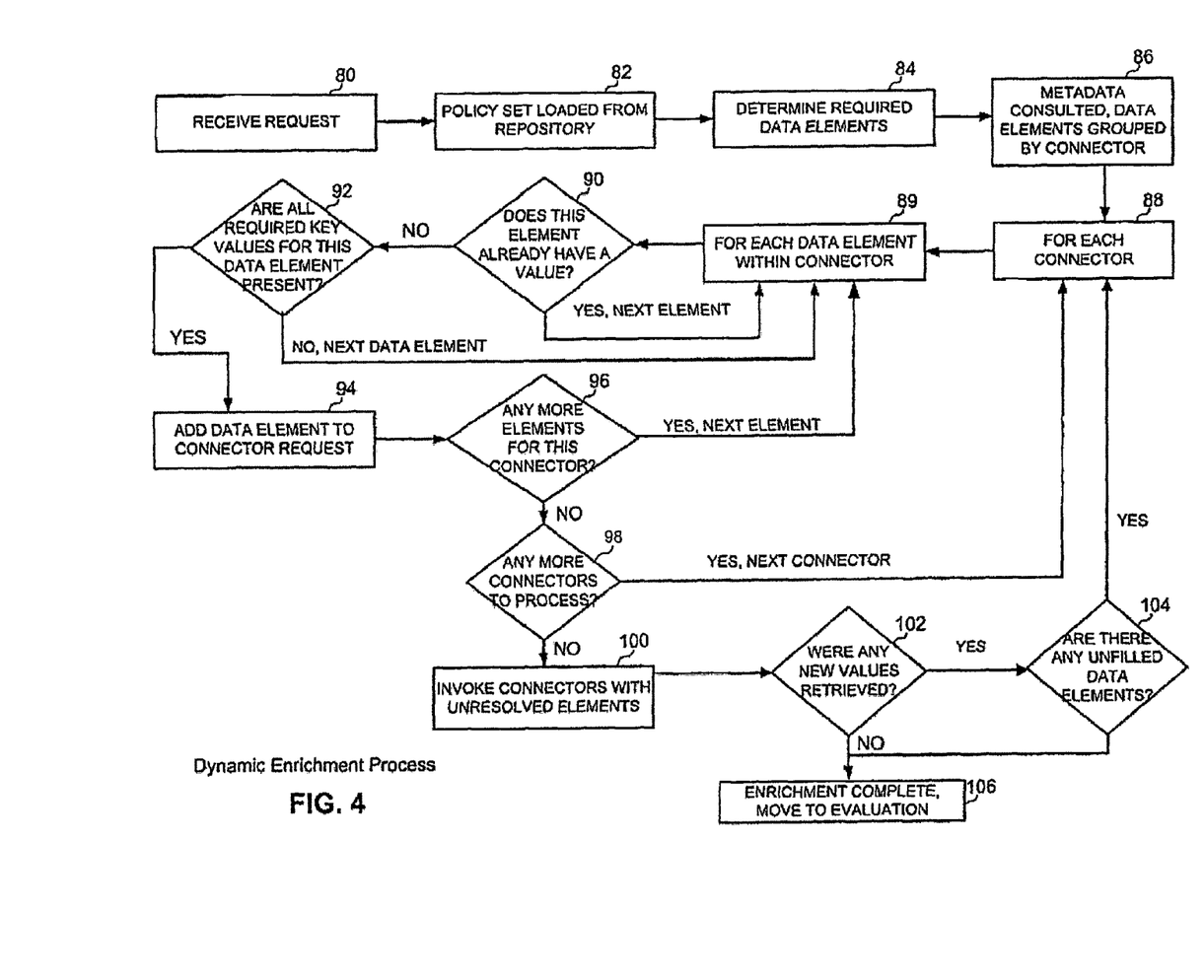
FIG. 4 depicts a Parallel Fault Tolerant Architecture that enables the enterprise security cluster to scale effectively across multiple servers and/or platforms while continuously servicing requests from the user community, even in the event of the loss of multiple servers.

The concept of dynamic enrichment of the data is available within the decision context depicted in FIG. 4. The dynamic enrichment process involves receiving a request in Step 80. In Step 82, in response to the request, a policy set is loaded from depository in Step 82. The policy set is analyzed to determine the required data elements in Step 84. In Step 86, metadata is consulted and data elements are grouped by connector. For each connector a determination is made in Step 88 for data for each data element within the connector. This involves determining whether or not each data element already has a value at Decision Point 90. If it does, an evaluation is made for the next data element. If not, a determination is made a Decision Point 92 as to whether or not all required key values for this data element are present. If all the required key values for this data element are present the data element is added to the connector request in Step 94, otherwise, a determination is made for the next data element. In Decision Point 96 a determination is made as to whether or not any more elements are required for this data connector. If additional elements are required the next data element is evaluated returning to Step 89. Otherwise, at Decision Point 98, a determination is made as to whether or not any more connectors remain to be processed. Additional connectors are processed as described above. Otherwise, the connectors with unresolved elements are invoked at Step 100 in order to retrieve new values. At Decision Point 102 a determination is made as to whether or not any new values were retrieved. If there were, at Decision Point 104, a determination is made as to whether any unfilled data elements remain in which case the process is repeated until no unfilled data elements remain at process in 106. Essentially, feature allows the rules engine to determine whether it has, on hand, all the data elements required to evaluate the policy—if the answer is no, then the rules engine has the ability, through connectors, to map to and retrieve all requisite data elements before evaluating the rule.

Figure 5A:
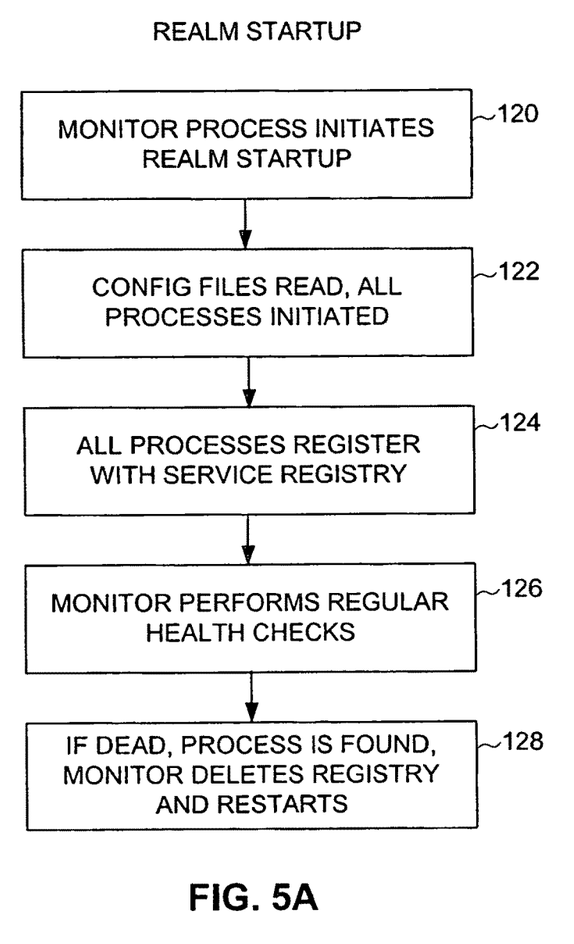
FIG. 5A depicts one embodiment of the process of realm start up.
Figure 5B:
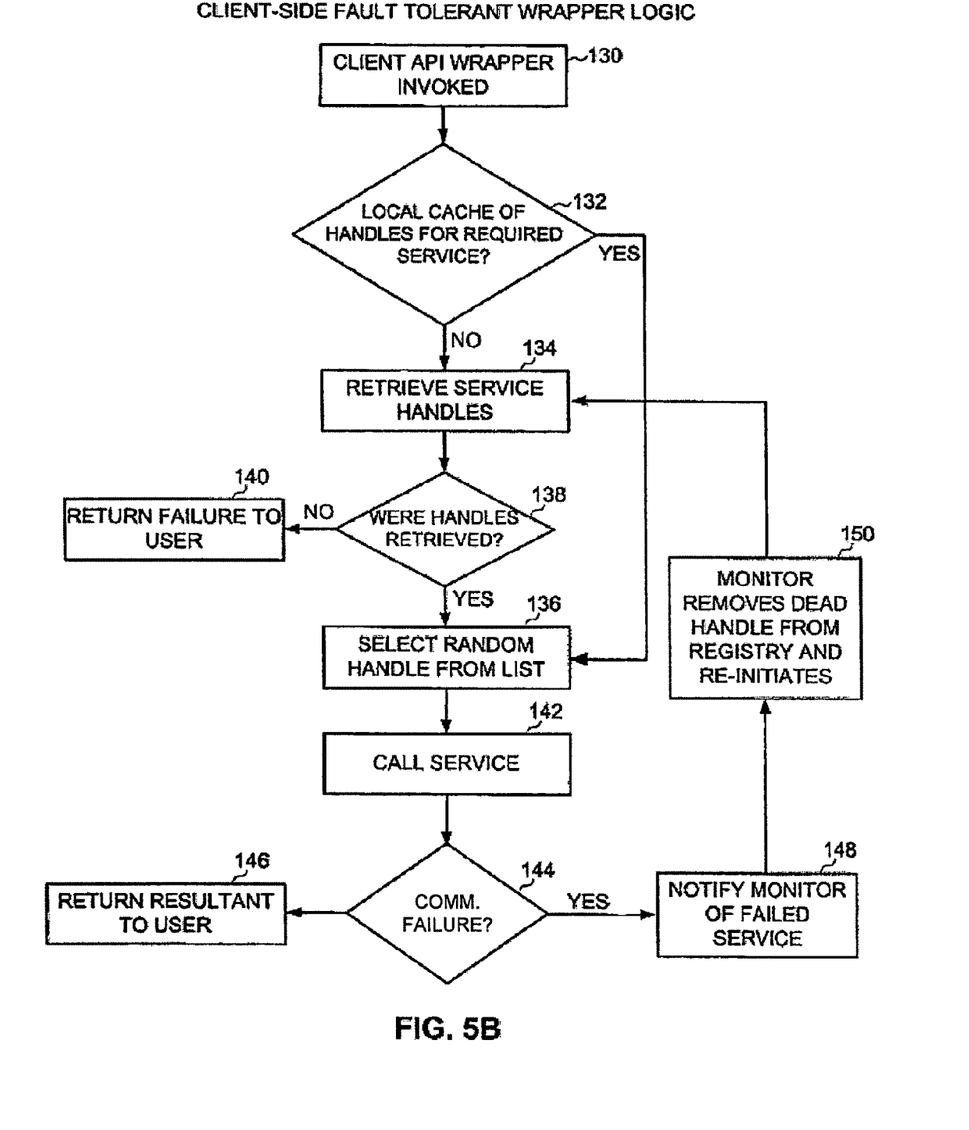
FIG. 5B depicts one embodiment of a client side fault tolerance wrapper.

A diverse, fault tolerant architecture that enables the enterprise security cluster to scale effectively across multiple servers and/or platforms while continuously servicing requests from the user community—even in the event of the loss of multiple servers is depicted in FIGS. 5A and 5B.

FIG. 5A depicts the process of realm startup. At step 120, the realm startup process is initiated. In step 122, all of the configuration files are read and associated processes are initiated. These processes are all registered with the service registry in step 124 after which the monitor performs regular health checks at predetermined intervals in step 126. If a dead process is found, the monitor deletes the registry and restarts the process in step 128.

FIG. 5B depicts client side fault tolerant wrapper logic. Here, in step 130 a client API wrapper is invoked. At decision point 132, a determination as to whether or not local cache of handles is required for service. If it is not required for service, the service handles are retrieved in step 134. Otherwise, a random handle is selected from the list from an available list in step 136. Returning to retrieving service handles, decision point 138 evaluates whether or not handles were retrieved. If they were not, a return failure is made to the user in step 140. Otherwise, we progress to step 136 where the random handles are selected from the list. In step 142, a service call is initiated, after which at decision point 144, a determination is made as to whether or not a communication failure is indicated. If no communication failure is indicated, the resultant is returned to the user in step 146. Otherwise, the monitor is notified of failed service. In step 148, it removes the dead handles from the registry and reinitiates in step 150, after which the process returns to step 134.

A content-based transactional "firewall" for HTTP/HTML traffic, which parses the HTTP transactional request headers and analyzes them to determine what the user is attempting to do. Once the resources the user is attempting to access have been identified, the enterprise security policy management engine is invoked to evaluate whether the request should be granted. This provides a non-invasive methodology for managing access to internal resources by external users.

The current implementation of this concept is built upon a Java infrastructure, and utilizes a number of fairly obscure features of the Java language to facilitate the service. The two most prominent of these are the concept of a dynamic class loader, and HTTP/XML RPC architecture used to manage the interaction between processes.

The dynamic class loader is used in the numerous components. In the rules evaluator, the class loader can be used to load the java classes needed to evaluate each rule as it is initially invoked. In the connector, the class loader is used to load the code fragments (packaged as Java classes) needed to service data requests. In the process launcher, the class loader is utilized to retrieve (from a realm-level executable repository) and load the actual service handler components of the process being started HTTP/XML RPC architecture is utilized heavily within this embodiment, as it is the primary communications infrastructure used to haul inter-process requests and data exchange. It utilized by literally every process in the architecture, and provides a common ground for communications between disparate languages, components, and platforms.

It is important to note that while one embodiment is implemented in the Java language, the concepts that distinguish the present invention are notably not Java specific, and in no way should the claims be restricted to the Java language or the platforms on which it runs. In a procedural language such as C/C++, PL/1, etc. the same concepts could readily be implemented through the use of dynamically shared libraries or through dynamic overlay methods that are well defined and commonplace.

Although the present invention is described in detail, it should be understood that various changes, substitutions and alterations can be made hereto without departing from the spirit and scope of the invention as described by the appended claims.

I claim:

1. A method to process authenticated user requests to access resources, the method comprising:
   receiving from a user a request to perform an action on a resource;
   receiving, by a server, a rule associated with the action, wherein the server comprises a processor and operatively associated memory, and wherein the rule indicates conditions under which a request to perform the action on the resource should be granted;
   determining a plurality of attributes required to evaluate the rule;
   classifying at least a portion of the plurality of attributes by connector, wherein each connector is in communication with an associated remote data source comprising values for attributes classified with the connector;
   for a first portion of the plurality of attributes classified with a first connector:
      for each of the first portion of the plurality of attributes, determining whether an attribute value for the attribute is present at the server;
      generating a first connector request, wherein the first connector request comprises each of the first portion of the plurality of attributes that lacks an attribute value at the server; and
      requesting attribute values for each attribute included in the first connector request, wherein the requesting takes place via the first connector and is directed to the remote data source associated with the first connector;
   evaluating, by the server, the user request to determine whether the user is authorized to perform the action on the resource, wherein the evaluating comprises applying the rule considering the values for the plurality of attributes; and
   returning an authorization decision.

2. The method of claim 1, further comprising, for a second portion of the plurality of attributes classified with a second connector:
   for each of the second portion of the plurality of attributes, determining whether an attribute value for the attribute is present at the server;
   generating a second connector request wherein the second connector request comprises each of the second portion of the plurality of attributes that lacks an attribute value at the server; and
   requesting attribute values for each attribute included in the second connector request, wherein the requesting takes place via the second connector and is directed to the remote data source associated with the second connector.

3. The method of claim 1, further comprising tracking each user request.

4. The method of claim 1, wherein the resource is a part of a resource hierarchy, and wherein the rule associated with the action is inherited from an ancestor of the resource within the resource hierarchy.

5. The method of claim 1, further comprising authenticating an identity of the user.

6. The method of claim 1, wherein the evaluating further comprises applying the rule considering all attribute values required by the rule.

7. The method of claim 1, wherein the rule is expressed in a machine-independent rules modeling language.

8. The method of claim 1, wherein a value for at least one of the first portion of the plurality of attributes is present at the server.

9. The method of claim 1, further comprising logging the request to perform an action on a resource.

10. The method of claim 1, further comprising generating an alarm upon the occurrence of an alarm event.

11. The method of claim 1, wherein the resources are selected from the group consisting of physical resources, information resources and online resources.

12. A computer system to process authenticated user requests to access resources, the system comprising at least one computer device comprising a processor and operatively associated memory, wherein the memory comprises instructions that, when executed by the at least one computer device, cause the at least one computer device to:
   receive from a user a request to perform an action on a resource;
   receive a rule associated with the action, wherein the rule indicates conditions under which a request to perform the action on the resource should be granted;
   determine a plurality of attributes required to evaluate the rule;
   classify at least a portion of the plurality of attributes by connector, wherein each connector is in communication with an associated remote data source comprising values for attributes classified with the connector;
   for a first portion of the plurality of attributes classified with a first connector:
      for each of the first portion of the plurality of attributes, determine whether an attribute value for the attribute is present at a server;
      generate a first connector request, wherein the first connector request comprises each of the first portion of the plurality of attributes that lacks an attribute value at the server; and
      request attribute values for each attribute included in the first connector request, wherein the requesting takes place via the first connector and is directed to the remote data source associated with the first connector;
   evaluate the user request to determine whether the user is authorized to perform the action on the resource, wherein the evaluating comprises applying the rule considering the values for the plurality of attributes; and
   return an authorization decision.

13. The system of claim 12, wherein the memory further comprises instructions that, when executed by the at least one computer device, cause the at least one computer device to:
   for each of the second portion of the plurality of attributes, determine whether an attribute value for the attribute is present at the server;
   generate a second connector request, wherein the second connector request comprises each of the second portion of the plurality of attributes that lacks an attribute value at the server; and
   request attribute values for each attribute included in the second connector request, wherein the requesting takes place via the second connector and is directed to the remote data source associated with the second connector.

14. The system of claim 12, wherein the memory further comprises instructions that, when executed by the at least one computer device, cause the at least one computer device to log each user request.

15. The system of claim 12, wherein the resource is a part of a resource hierarchy, and wherein the rule associated with the action is inherited from an ancestor of the resource within the resource hierarchy.

16. The system of claim 12, wherein the memory further comprises instructions that, when executed by the at least one computer device, cause the at least one computer device to authenticate an identity of the user.

17. The system of claim 12, wherein the evaluating further comprises applying the rule considering all attribute values required by the rule.

18. The system of claim 12, wherein the rule is expressed in a machine-independent rules modeling language.

19. The system of claim 12, wherein a value for at least one of the first portion of the plurality of attributes is present at the server.

20. The system of claim 12, wherein the resources are selected from the group consisting of physical resources, information resources and online resources.

21. A method to process authenticated user requests to access resources, the method comprising:

receiving from a user a request to perform an action on a resource;

receiving a rule associated with the action, wherein the rule indicates conditions under which a request to perform the action on the resource should be granted;

determining a plurality of attributes required to evaluate the rule;

for each of the plurality of attributes, determining whether an attribute value for the attribute must be requested;

generating a request for at least a portion of the attribute values that must be requested, wherein the at least a portion of the attribute values that must be requested are associated with a remote data source comprising values for each of the at least a portion of the attribute values that must be requested;

requesting attribute values included in the request for at least a portion of the attribute values that must be requested, wherein the requesting is directed to the remote data source comprising values for each of the at least a portion of the attribute values that must be requested;

evaluating, by a server, the user request to perform an action on a resource to determine whether the user is authorized to perform the action on the resource, wherein the evaluating comprises applying the rule considering the values for the plurality of attributes; and returning an authorization decision.

22. The method of claim 21, further comprising:

classifying, by connector, the at least a portion of the plurality of attributes for which attribute values must be requested, wherein each connector is in communication with an associated remote data source comprising values for attributes classified with the connector, and wherein the request for at least a portion of the attribute values that must be requested is a first connector request associated with the at least a portion of the attribute values that must be requested classified with a first connector.

23. The method of claim 21, wherein the requesting takes place via a first connector request and is directed to the remote data source associated with the first connector.

24. The method of claim 22, further comprising, for a second portion of the plurality of attributes for which attribute values must be requested classified with a second connector:

for each of the second portion of the plurality of attributes, determining whether an attribute value for the attribute must be requested;

generating a second connector request wherein the second connector request comprises at least a portion of the second attribute values that must be requested; and requesting attribute values for each second attribute values included in the second connector request, wherein the requesting takes place via the second connector and is directed to the remote data source associated with the second connector.

* * * * *